US006219516B1

United States Patent
Furst et al.

(10) Patent No.: US 6,219,516 B1
(45) Date of Patent: Apr. 17, 2001

(54) SYSTEMS AND METHODS FOR REDUCING IMAGE REGISTRATION ERRORS

(75) Inventors: Michael R. Furst, Rochester; Daniel W. Costanza, Webster, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/232,813

(22) Filed: Jan. 19, 1999

(51) Int. Cl.[7] ................................................ G03G 15/00
(52) U.S. Cl. ............................................. 399/301; 399/299
(58) Field of Search ..................................... 399/301, 298, 399/299, 300, 223, 231, 313; 358/300

(56) References Cited

U.S. PATENT DOCUMENTS

| 4,745,490 | * | 5/1988 | Shimizu et al. | 358/300 |
|---|---|---|---|---|
| 5,452,073 | * | 9/1995 | Kataoka | 399/299 |
| 5,598,257 | * | 1/1997 | Keller et al. | 399/364 |
| 5,872,586 | * | 2/1999 | Shio | 399/301 X |
| 5,881,346 | * | 3/1999 | Mori et al. | 399/301 |
| 5,930,556 | * | 7/1999 | Imamiya | 399/299 |
| 6,047,156 | * | 4/2000 | De Bock et al. | 399/298 |
| 6,100,907 | * | 8/2000 | Uffel | 358/300 X |

* cited by examiner

Primary Examiner—Quana M. Grainger
(74) Attorney, Agent, or Firm—Oliff & Berridge, PLC

(57) ABSTRACT

An image processing apparatus comprises a tandem print engine configuration for forming two-sided prints. The print engines include a master print engine and a slave print engine downstream from the master print engine. The image processing apparatus matches the periods of revolution of the photoreceptors of the master and slave print engines during print runs, by simultaneously adjusting both the velocity of the slave photoreceptor and color imagers of the slave print engine. The velocity controllers for the slave photoreceptor and imagers can have the same dynamic response and can be simultaneously actuated, to minimize incremental registration errors in the slave print engine. In addition, the controllers can be operated at an adjustment level that is achievable by both controllers.

32 Claims, 12 Drawing Sheets

Selected Model Parameters:
5 Hz Bandwidth vs. 30 Hz Bandwidth
P/R velocity amplitude set at ROS Quantization error
Result:
MAX Error = 0.013627 mm Selected Model Parameters:
40 Hz Bandwidth vs. 30 Hz Bandwidth
P/R velocity amplitude set at ROS Quantization error
Result:
MAX Error = 0.000815 mm

SYSTEMS AND METHODS FOR REDUCING IMAGE REGISTRATION ERRORS

BACKGROUND OF THE INVENTION

1. Field of Invention

This invention generally relates to maintaining image registration in color image processing. More particularly, this invention relates to systems and methods in which image registration errors in color output images are reduced in image processing systems that include tandem print engines.

2. Description of Related Art

Electrophotography, a method of copying or printing documents, is performed by exposing a light image. representation of a desired original image onto a substantially uniformly charged photoreceptor substrate, such as a photoreceptor belt. In response to this light image, the photoreceptor discharges to create an electrostatic latent image of the desired original image on the photoreceptor's surface. Developing material, or toner, is then deposited onto the latent image to form a developed image. The developed image is then transferred to an image receiving substrate. The surface of the photoreceptor is then cleaned to remove residual developing material and the surface as recharged by a charging device in preparation for the production of the next image.

Color images can be produced by repeating the above-described recording process once for each differently-colored toner that is used to make a composite color image. For example, in a one-color imaging process, referred to herein as the Recharge, Expose, and Develop, Image (REaD IOI) process, a charged photoreceptor surface is exposed to a light image that represents a first color. The resulting electrostatic latent image is then developed with a first colored toner. The toner is typically of a subtractive primary color, including magenta, yellow, cyan, or black. The charge, expose and develop process is repeated for a second colored toner, then for a third colored toner, and finally for a fourth colored toner. The four differently-colored toners are placed in superimposed registration on the photoreceptor so that a desired composite color image results. That composite color image is then transferred and fused onto an image receiving substrate.

SUMMARY OF THE INVENTION

Tandem print engine systems include two print engines arranged in a series configuration. Each print engine includes a photoreceptor belt and imagers disposed at spaced positions along the length, i.e., the process direction, of the photoreceptor belt. Each imager comprises an image source that exposes the photoreceptor belt. Typically, the image source includes a light emitting device that emits a light beam that is moved laterally across the photoreceptor belt to expose the photoreceptor belt to create a latent electrostatic image on the photoreceptor belt. Each latent image is then developed as outlined above. Image receiving substrates, such as sheets of copy paper, are fed in a time-controlled manner to the print engines. The first print engine transfers its developed image to the simplex side of the image receiving substrate. The image receiving substrate is then inverted and presented to the second print engine. The second print engine then transfers its developed image to the duplex side of the image receiving substrate.

Each photoreceptor belt of the first and second print engines includes a seam where opposed end portions of the photoreceptor belt are joined together. The photoreceptor belts include pitch regions in which images can be satisfactorily formed. Images cannot be satisfactorily formed at the seams, because the images formed at seams are normally defective. Accordingly, it is important to control the locations of the seams of both of the first and second photoreceptor belts during print runs, to prevent forming images at the seams, and to ensure that images are formed only in the pitch regions.

In a tandem print engine configuration, there arc several technology issues involved with synchronizing two photoreceptor belt modules of two separate print engines in a manner that does not negatively impact the registration of either module. If the periods of revolution of the two photoreceptor belts are not matched, then the positions of the seams will also not be synchronized. The photoreceptor belts can have different lengths and, accordingly, in such configurations must rotate at different velocities (speeds) to maintain the same periods of revolution. If the periods of revolution are not synchronized appropriately to each other or with imager velocities, image registration errors will occur during printing. The image registration errors can be characterized as 1) simplex to duplex image registration errors if the photoreceptor and imager velocities for each print engine are not matched appropriately, or 2) image-on-image (IOI) registration errors from changes in the photoreceptor velocity or imager velocity while printing is occurring. Image-on-image registration errors occur during the building of color images on the photoreceptor belts. If, during stacking the multiple color separation layers of a color image on each other, the images are not aligned with each other, then image registration errors between the color separation layers will occur. These registration errors produce print defects such as color shifts and trapping errors.

Registration errors are caused generally by the motion quality of the photoreceptor belts and the manner that the imagers form the latent images on the photoreceptor belts. Regarding the motion quality of the photoreceptor belts, image registration errors can be caused by changes in the photoreceptor belt velocity, making it difficult to form images smoothly and to align lead edges of the images on the photoreceptor belt. Velocity changes can occur due to various different factors, including errors of the drive motor, errors in roller velocities and diameters, belt length changes during operation due to tension and thermal effects, and normal roller and belt tolerances.

Factors that can cause registration errors in the manner in which the imagers form the latent images, include errors in the lateral scan velocity, i.e., the exposure velocity, of the image sources across the photoreceptor belt, the scanning start and end points of the scanning light beam, and the length of the scan lines.

In simplex (single print engine) configurations, the image registration can be set up off-line. Thus, adjustments can be made at times when print runs are not being performed. In such configurations, the photoreceptor belt velocity is maintained as constant as possible to minimize registration errors. In addition, the imagers are set to a specific reference and their velocity is tightly maintained. If, during the course of producing an image, the velocity of the photoreceptor belt and the scan velocity of the image sources of the imager vary with respect to each other, either in position or velocity, then registration errors will occur.

Simplex print engine systems can include monitoring systems for measuring and compensating for image registration errors. Simplex print engine systems can calibrate themselves to the characteristics of the photoreceptor belt to achieve good image alignment for color images. If the photoreceptor belt rims either too fast or too slow, the scan velocity of the image sources can be automatically adjusted to counter the change in the photoreceptor belt velocity. As long as the photoreceptor belt velocity is maintained substantially constant, then only small image registration errors occur due to the self-correcting measures that are taken by the system.

For tandem print engine configurations, however, the synchronization requirements for the two print engines require that the photoreceptor belt velocity of the downstream print engine, i.e., the "slave print engine," must be adjusted to keep it timed with the period of revolution of the photoreceptor belt of the upstream print engine, i.e., the "master print engine," Otherwise, it is not possible to control the locations of the seams of the photoreceptor belts of the master and slave print engines. As explained, it is important to control the seams to prevent the formation of images on the seams.

In tandem print engine configurations, various factors can cause the two photoreceptor belts to be out of synchronization with each other. Namely, the photoreceptor belt velocities and lengths can change over time due to changes in the roller diameters, encoder diameters and thermal effects. The belt length can be out of specification originally and can also vary during operation due to stretch caused by tension and thermal effects. The encoder roller that measures the belt velocity can change in diameter due to thermal effects. Consequently, the photoreceptor belts can run at different periods of revolution. In addition, errors can occur between the scan velocities of the image sources of the imagers of the different print engines. However, as outlined above, the scan velocities of the imagers also need to be coordinated with the velocity of the associated photoreceptor belt.

In order to synchronize the photoreceptor belts of the master and slave print engines, the photoreceptor belt velocity of the slave print engine can be changed. In making such adjustments for the slave print engine, the slave print engine should be adjusted on-line. Otherwise, the productivity of the tandem print engine is decreased.

One possible approach to making such velocity adjustments while the slave print engine is on-line includes making the velocity adjustments for the slave print engine sufficiently small that the adjustments would produce registration errors so small that they would be almost imperceptible. This approach, however, requires stringent adjustment resolution or quantization levels in the photoreceptor belt and in imager controllers of the slave print engine, because both subsystems will need to be adjusted when the photoreceptor belt velocity is adjusted. The cost implications of such fine adjustment capability are high.

A high level of resolution is presently achievable for the slave print engine photoreceptor belt module. Velocity resolutions down to about $1/64$ Hz (or 0.00082%) can currently be achieved. Such small changes are expected to be imperceptible. Thus, the photoreceptor belt velocity of the slave print engine could be adjusted slowly at a sufficiently small step size without undue registration errors occurring.

It is not, however, presently possible to satisfactorily reduce the image registration errors by making such small step size adjustments of the photoreceptor belt velocity for the slave print engine. That is, in tandem print engines, the ratio of the velocity of the photoreceptor belt and the velocity of the imagers, for example the scan velocity, or exposure velocity, of image sources, defines the absolute magnification of the final image that is formed on the photoreceptor belt. Accordingly, if the photoreceptor belt velocity is changed, then the imager velocity must also be changed to maintain the desired ratio, or else the length of the image in the process, or slow scan, direction will change. Consequently, the imager velocity must be adjusted to maintain the desired absolute magnification, to maintain the ratio of the photoreceptor belt velocity to the imager velocity.

Imager controllers can have, for example, 32, 64, 128 or 256 discrete levels of imager scan velocity adjustment for the light emitting devices. With 256 steps over the adjustment range that is desirable for imagers, which is typically about 1.6%, the adjustment resolution is about 0.0125% per step. This adjustment resolution is very coarse, and is about fifteen times greater, compared to present adjustment capabilities of photoreceptor belt controllers. This adjustment resolution would cause significant image registration errors if changes were made to the imager velocity during a print run. However, improving upon this adjustment resolution of the imagers is not a satisfactory solution to this problem, because, as the number of adjustment level increases, the more difficult the adjustment implementation becomes and the more expensive the adjustment system generally becomes.

Adjusting the velocities of the imagers at the coarse adjustment capabilities of the imager controller is also unsatisfactory. That is, in order to avoid large registration errors, it would be necessary to make changes to the imager velocity only at times when print runs are not being performed, i.e, when the slave print engine is off-line. This approach would require that the slave print engine be taken off-line periodically and skipping one revolution of the photoreceptor belt to adjust the imager velocity. This approach would create a decrease in the tandem print engine productivity, as the master print engine would also have to go off-line at the same time. In addition, this approach would also add additional complexity to the machine communications and scheduling algorithm needed for tandem print engine configurations. Accordingly, making adjustments to the imager velocity off-line would also be unsatisfactory.

This invention provides systems and methods that reduce image registration errors in tandem print engine configurations.

This invention separately provides systems and methods that can minimize image registration errors in slave print engines in tandem print engine configurations without a loss of productivity.

This invention separately provides systems and methods that adjust the velocities of the photoreceptor and the imagers of a print engine at the same adjustment quantization level. The photoreceptor is typically in the form of a photoreceptor belt.

This invention separately provides systems and methods that reduce the number of adjustment levels that are needed to minimize image registration errors.

This invention separately provides systems and methods in which the photoreceptor velocity and the imager velocities are simultaneously adjusted to maintain a desired ratio between these velocities.

This invention separately provides systems and methods that can change the photoreceptor velocity and the imager velocities of the slave print engine during print runs.

This invention separately provides systems and methods in which closed-loop dynamic responses of both the photoreceptor velocity controller and the imager velocity controller can be made at a selected quantization level.

This invention separately provides systems and methods that cancel the effects of the errors that the photoreceptor velocity controller and the imager velocity controller would cause.

This invention separately provides systems and methods that reduce image registration errors that can be used in various tandem print engine configurations in which the photoreceptors need to be synchronized and actively adjusted during print runs.

As discussed in greater detail below, changes in the ratio between the velocities of the photoreceptor belt and the imagers in a print engine cause image registration errors in the print engine.

The velocity adjustments can thus be made at an adjustment level that can be achieved by the controllers of both the photoreceptor and the imagers. Thus, even in systems in which the adjustment resolution capabilities of the two subsystems vary significantly, the adjustments to both systems can be made at an adjustment level that is achievable by both systems.

Because it is not necessary to take the slave print engine off-line periodically to make such adjustments, the systems and methods of this invention can improve productivity in tandem print engine configurations. The systems and methods of this invention also avoid the need to introduce additionally complex machine communications and scheduling techniques that would be needed to be able to make adjustments off-line in tandem print engine configurations.

One exemplary embodiment of an image processing system that forms an image on an image receiving substrate according to this invention comprises a first print engine and a second print engine downstream from the first print engine. The second print engine is slaved to the first print engine. The first print engine comprises a first photoreceptor having a first period of revolution. The second print engine comprises a second photoreceptor having a second period of revolution. The image processing system further comprises a synchronization controller that substantially matches the first period of revolution of the first photoreceptor and the second period of revolution of the second photoreceptor during a print run of the image processing apparatus. The first and second periods of revolution are matched and updates to the second photoreceptor and imagers are made such that a first image registration error of the image formed on the image receiving substrate by the first print engine substantially equals a second image registration error of the image formed on the image receiving substrate by the second print engine. Accordingly, the incremental image registration error of the second print engine is sufficiently small to enable tandem print engine operation with only little or no loss of performance.

In some exemplary embodiments of the image processing system of this invention, the first and second photoreceptors each comprise a photoreceptor belt.

In another exemplary embodiment of the image processing system of this invention, the second print engine can comprise a plurality of imagers positioned along the process direction of the second photoreceptor belt. Each imager forms an image separation on the second photoreceptor belt to form a composite color image. The imagers each include an image source that exposes the second photoreceptor belt.

In a third exemplary embodiment, the image processing system further comprises a first controller that controls the belt velocity of the second photoreceptor belt. The photoreceptor belt velocity can be controlled by the first controller such that the second period of revolution of the second photoreceptor belt matches the first period of revolution of the first photoreceptor belt during the print run. The image processing system can further comprise a second controller that controls the exposure velocity of the image sources on the second photoreceptor belt.

In a fourth exemplary embodiment of the systems and methods of this invention, the first and second controllers can be simultaneously actuated during print runs of the image processing apparatus to adjust the respective belt velocity of the second photoreceptor belt and the exposure velocities of the image sources. In addition, the first and second controllers both can have the same dynamic response. The first and second controllers can maintain a substantially constant ratio between the belt velocity and the exposure velocities during the print runs.

In a fifth exemplary embodiment of the systems and methods of this invention, the first controller and the second controller can adjust the belt velocity of the second photoreceptor belt and the exposure velocities of the image sources, respectively, at substantially the same quantization level.

These and other features and advantages of the systems and methods of this invention are described in or are apparent from the following detailed description of the preferred embodiments.

BRIEF DESCRIPTION OF THE DRAWINGS

This invention will be described in relation to the following drawings, in which reference numerals refer to like elements, and wherein.

DETAILED DESCRIPTION OF PREFERRED EMBODIMENTS

Figure 1:
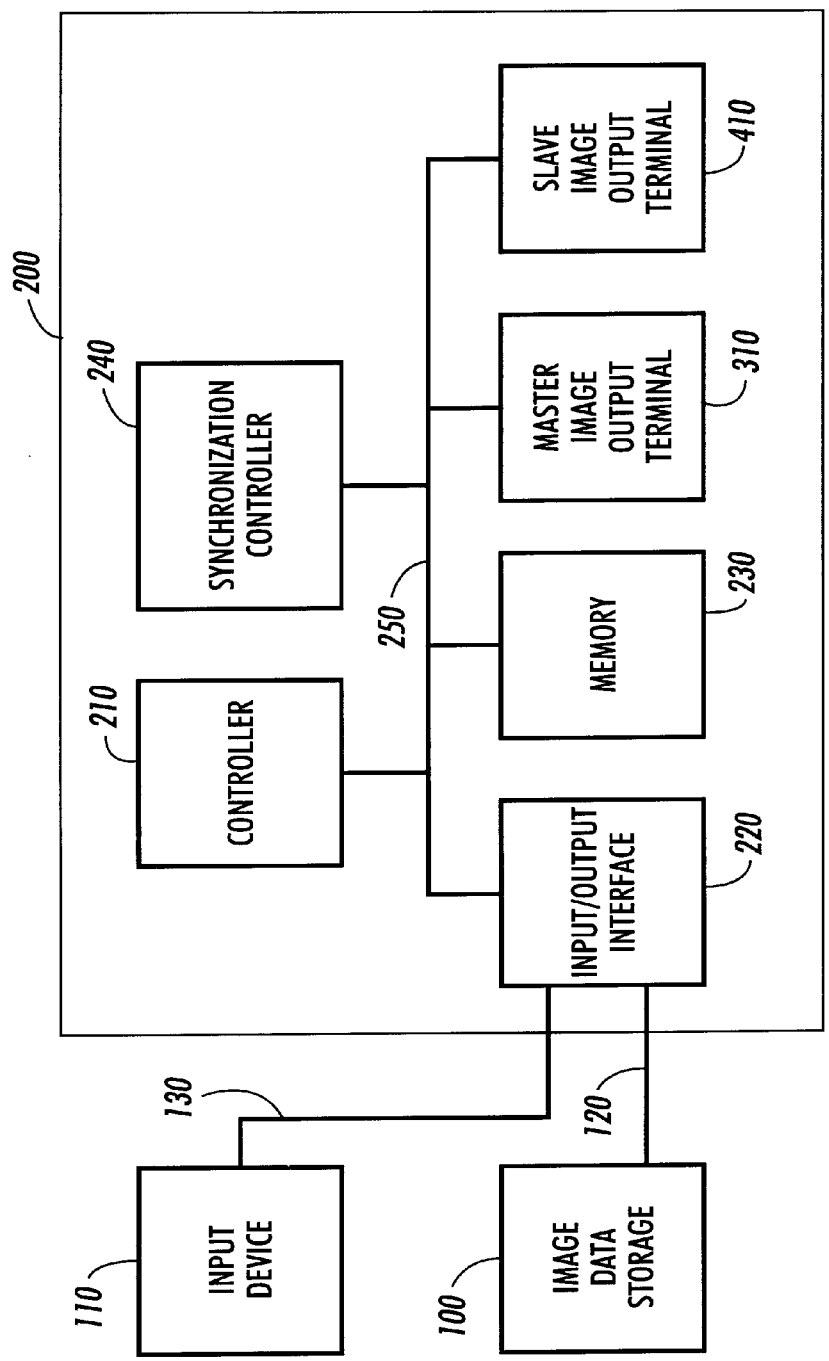
FIG. 1 shows one exemplary embodiment of an image processing apparatus that incorporates the image registration control system of this invention.

FIG. 1 shows one exemplary embodiment of an image processing apparatus incorporating image registration control systems in accordance with this invention. As shown, an image data source 100 and an input device 110 are connected to the image processing apparatus 200 over links 120 and 130, respectively. The image data source 100 can be a digital camera, a scammer, or a locally or remotely located computer, or any other known or later developed device that is capable of generating electronic image data. Similarly, the image data source 100 can be any suitable device that stores and/or transmits electronic image data, such as a client or a server of a network. The image data source 100 can be integrated with the image processing apparatus 200, as in a digital copier having an integrated scanner, or the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from electronic image data, the electronic image data can be generated at any time prior to the printing. Moreover, the electronic image data need not be generated from an original physical document, but can optionally be created from scratch electronically. The image data source 100 is thus any known or later developed device that is capable of supplying electronic image data over the link 120 to the image processing apparatus 200. The link 120 can thus be any known or later developed system or device for transmitting the electronic image data from the image data source 100 to the image processing apparatus 200.

The input device 110 can be any known or later developed device for providing control information from a user to the image processing apparatus 200. Thus, the input device 110 can be a control panel of the image processing apparatus, or can be a control program executing on a locally or remotely located general purpose computer, or the like. As with the link 120 described above, the link 130 can be any known or later developed device for transmitting control signals and data input using the input device 110 from the input device 110 to the image processing apparatus 200.

Figure 2:
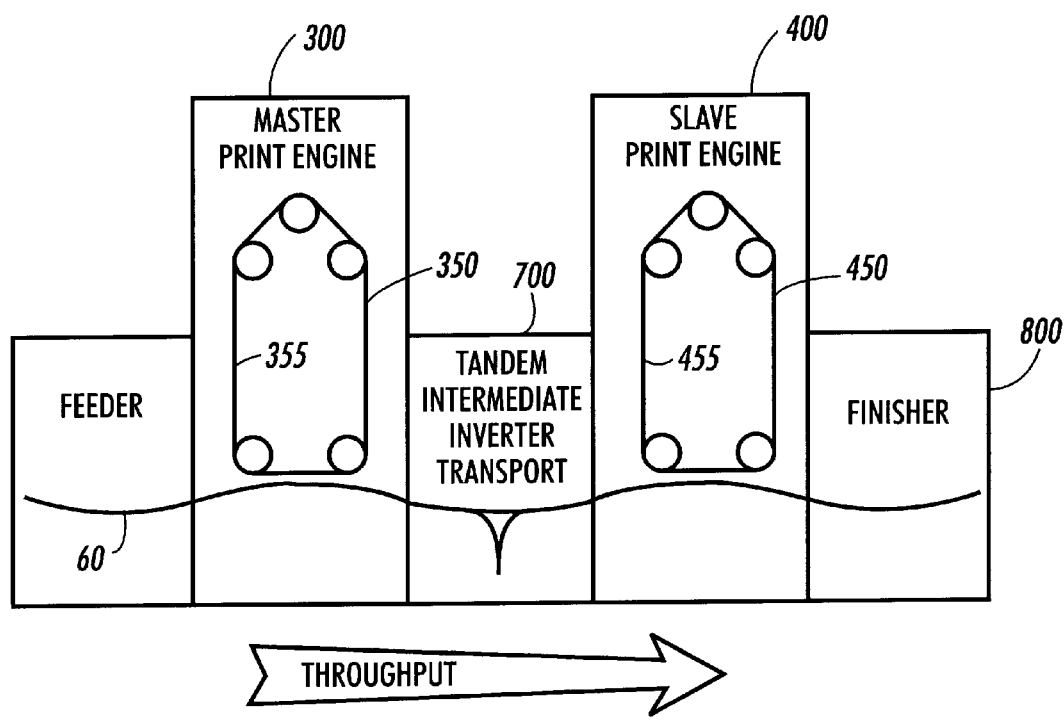
FIG. 2 schematically illustrates a tandem print engine system.

As shown in FIGS. 1 and 2, in one exemplary embodiment, the image processing apparatus 200 includes a controller 210, an input/output interface 220, a memory 230, a master print engine 300, a slave print engine 400, and a synchronization controller 240, each of which is interconnected by a control and/or data bus 250. The links 120 and 130 from the image data source 100 and the input device 110, respectively, are connected to the input/output interface 220. The electronic image data from the image data source 100, and any control and/or data signals from the input device 110, are input through the input interface, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory 230 includes a fixed portion, the fixed portion can be implemented using a ROM, a PROM, an EPROM, and EEPROM, a CD-ROM and disk drive, a writable optical disk and disk drive, or any other known or later developed fixed memory device.

FIG. 2 illustrates one exemplary tandem print engine configuration of the image processing apparatus 200. As shown, the tandem print engine includes the master print engine 300 and the slave print engine 400 arranged in a series configuration. During a print run of the image processing apparatus 200, a feeder 600 feeds an image receiving substrate, such as copy paper, to the master print engine 300. The image receiving substrate has a simplex side and a duplex side. The master print engine 300 prints a colored image on the simplex side of the image receiving substrate. The image receiving substrate is then inverted by an inverter transport device 700, disposed between the master print engine 300 and the slave print engine 400, and transported to the slave print engine 400. The slave print engine 400 prints a colored image on the duplex side of the image receiving substrate. The image receiving substrate is then transported to a finisher device 800.

Figure 4:
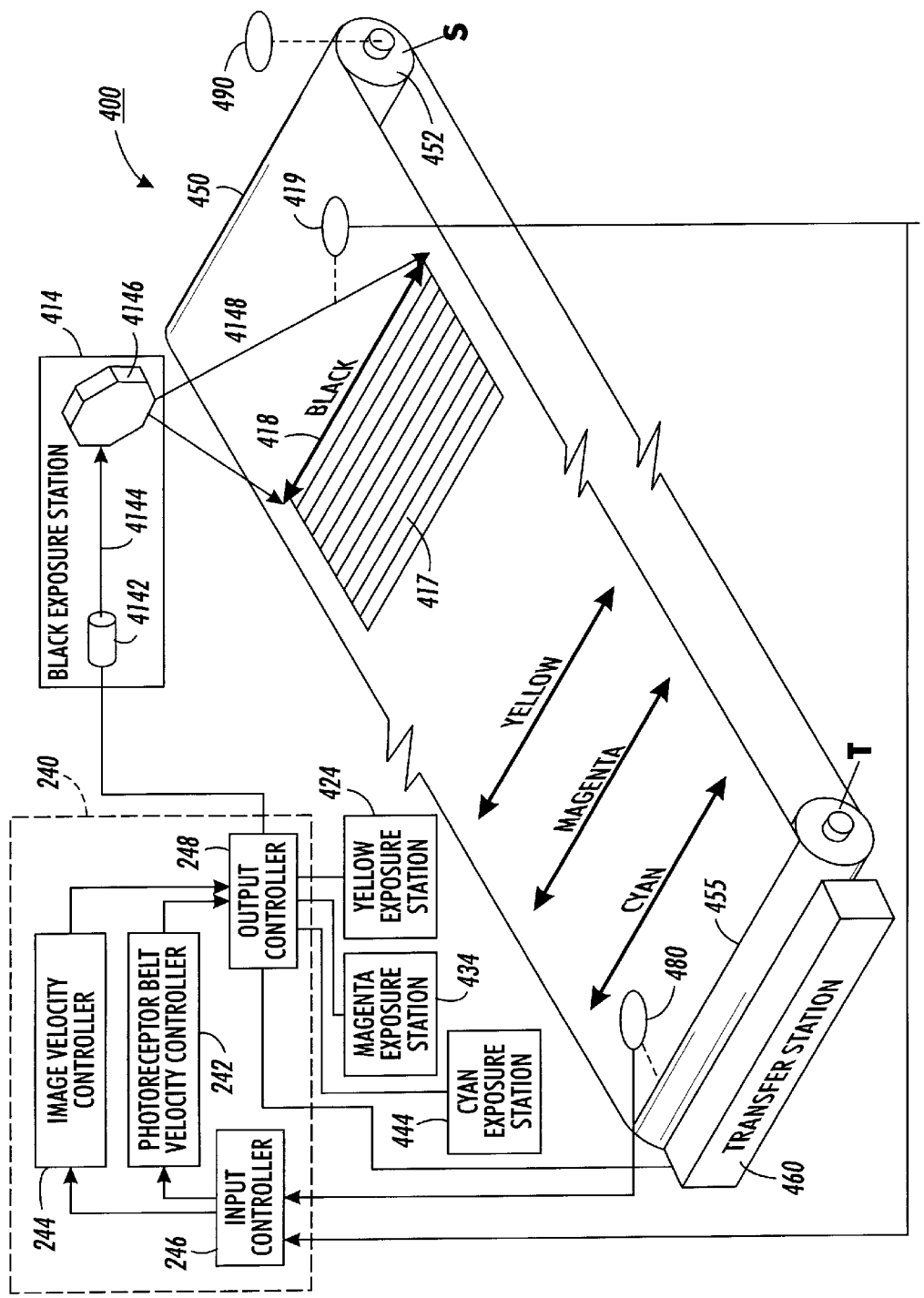
FIG. 4 shows one exemplary embodiment of the photoreceptor belt provided with image registration control as shown in FIG. 3 in greater detail.

As shown in FIG. 2, the master print engine 300 includes a photoreceptor that comprises a master photoreceptor belt 350 and the slave print engine 400 includes a photoreceptor that comprises a slave photoreceptor belt 450. As shown in FIGS. 2 and 4, the master photoreceptor belt 350 has a seam 355 and the slave photoreceptor belt 450 has a seam 455. The master photoreceptor belt 350 and the slave photoreceptor belt 450 each rotate at a selected period of revolution, i.e., the amount of time for the belt to make one complete revolution. The synchronization controller 240 adjusts the velocity of the slave photoreceptor belt 450 and the velocity of the imagers of the slave print engine 400, if the sensors associated with the master photoreceptor belt 350 and the slave photoreceptor belt 450, indicate that the periods of revolution of the master and slave photoreceptor belts 350 and 450 are not properly matched.

Figure 3:
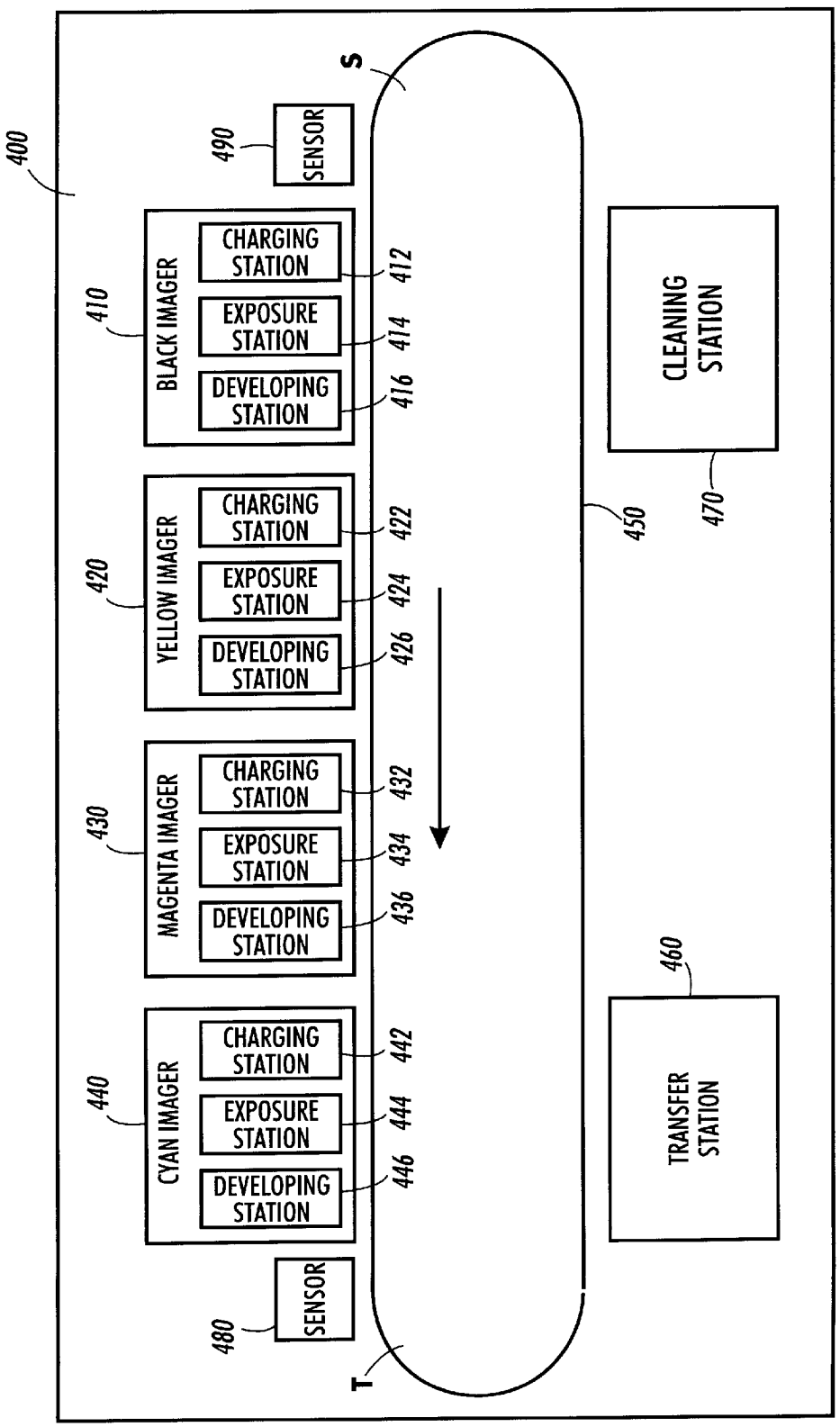
FIG. 3 shows one exemplary embodiment of a photocopier that incorporates the image registration control of this invention.

FIG. 3 shows one exemplary embodiment of the slave print engine 400 according to this invention. The slave print engine 400 and the master print engine 300 can have the same configuration. Accordingly, only the slave print engine 400 will be described in detail. As shown in FIG. 3, the slave print engine 400 includes the color imagers 410, 420, 430 and 440, the slave photoreceptor belt 450, an image transfer station 460, a cleaning station 470, a photoreceptor belt seam sensor 480, and a photoreceptor belt velocity sensor 490.

As shown in FIG. 3, the color imagers 410, 420, 430 and 440 are located along the process direction of the slave photoreceptor belt 450 between a steering end S and a transfer end T of the slave photoreceptor belt 450. Each of the color imagers 410, 420, 430 and 440 includes a respective charging station 412, 422, 432 and 442; an exposure station 414, 424, 434 and 444; and a developing station 416, 426, 436 and 446. In each of the imagers 410, 420, 430 and 440, the respective charging station 412, 422, 432 and 442, uniformly charges the slave photoreceptor belt 450 in preparation for forming a latent electrostatic image. In each of the imagers 410, 420, 430 and 440, the respective exposure station 414, 424, 434 and 444 exposes the uniformly charged slave photoreceptor belt 450 to form a latent electrostatic image. Then, in each of the imagers 410, 420, 430 and 440, the respective developing station 416, 426, 436 and 446 applies a toner of a different color to develop the corresponding latent electrostatic image formed on the slave photoreceptor belt 450 using the differently-colored toners.

In the illustrated embodiment, the imager 410 forms a black color separation image, the imager 420 forms a yellow color separation image, the imager 430 forms a magenta color separation image, and the imager 440 forms a cyan color separation. It will be appreciated that the imagers 410–440 can alternatively use other colors.

It should be appreciated that each of the exposure stations of the respective master and slave print engines 300 and 400 can be implemented using any known or later developed device for forming an electrostatic latent image on the respective master and slave photoreceptor belts 350 and 450. For example, the image forming device can be a rotating polygon raster output scanner (ROS), a full width printbar containing light emitting diodes (LEDs), laser diodes, organic light emitting diodes or the like. When the exposure stations 412–442 are implemented using rotating polygon raster output scanners, the raster output scanners of the respective exposure stations scan laterally across the master and slave photoreceptor belts 350 and 450 at a selected scan velocity that is related to the belt velocity, to achieve a proper image size on the image receiving substrate.

As explained above, during a print run, the imagers 410, 420, 430 and 440 each form a different color separation image on the slave photoreceptor belt 450, and the color separation images are built up on top of each other to form a composite color image. If the distinct color separation images are not aligned with other on the slave photoreceptor belt 450, then image registration errors, i.e., misregistration, will occur due to the image registration offset in the colored image.

The photoreceptor belt seam sensor 480 senses the seam 455 of the slave photoreceptor belt 450. The photoreceptor belt velocity sensor 490 senses the velocity of the slave photoreceptor belt 450. The photoreceptor belt velocity sensor 490 senses, for example, the speed of rotation of a drive roller 452 that drives the slave photoreceptor belt 450. By changing the rotation speed of the drive roller 452, the velocity and, thus the period of revolution, of the slave photoreceptor belt 450 can be adjusted.

FIG. 4 shows in greater detail one exemplary embodiment of the slave print engine 400 shown in FIGS. 1 and 3. In this exemplary embodiment of the slave print engine 400, each of the exposure stations 414, 424, 434 and 444 of the respective imagers 410, 420, 430 and 440 comprises a raster output scanner to expose the slave photoreceptor belt 450. In FIG. 4, only the raster output scanner of the black exposure station 414 is shown in detail. The raster output scanners of the other exposure stations will be identical. As shown in FIG. 4, the exposure station 414 includes an image source 4142 that emits at least one light beam 4144. Each light beam 4144 emitted by the image source 4142 is imaged onto a rotating polygon mirror 4146 by input optics (not shown). Each light beam 4144 reflected from the rotating polygon mirror 4146 is imaged onto the slave photoreceptor belt 450 using a set of output optics (not shown).

As shown in FIG. 4, a black color separation image 417 formed on the slave photoreceptor belt 450 comprises a plurality of lateral scanlines 418. Each scanline 418 has a beginning point and an ending point. The color separation images also comprise such lateral scanlines. The begining point, or "start of scan" point, is the point at which the current facet of the rotating polygon mirror 4146 directs each of the one or more light beams 4144 onto an appropriate portion of the slave photoreceptor belt 450 such that image data can be recorded. The scan velocity detector 419 detects the amount of time for the scanlines 418 of the color separation images 417 to be formed on the slave photoreceptor belt 450.

As shown in FIG. 4, in one exemplary embodiment, the synchronization controller 240 includes a photoreceptor belt velocity controller 242 and an imager velocity controller 244, which are connected to the slave photoceptor belt 450 and the imagers 410–440, respectively, of the slave print engine 400 over the control and/or data bus 250. The synchronization controller 240 adjusts the velocity of the slave photoreceptor belt 450 and the velocities of the imagers 410–440 of the slave print engine while the slave print engine 400 is on-line. Consequently, the systems and methods of this invention can overcome problems associated with making such velocity adjustments while the slave print engine 400 is on-line. As a result, color image registration errors in the slave print engine 400 can be reduced, and problems associated with taking the slave print engine 400 off-line to make such corrections can be avoided.

As shown in FIG. 4, the synchronization controller 240 comprises the photoreceptor belt velocity controller 242 and the imager velocity controller 244 to separately control the velocity of the slave photoreceptor belt 450 and the exposure velocities of the imagers 410, 420, 430 and 440, an input controller 246 and an output controller 248. The photoreceptor belt velocity controller 242 and the imager velocity controller 244 can be simultaneously actuated during a print run of the slave print engine 400 to adjust the respective velocity of the slave photoreceptor belt 450 and the exposure velocities of the imagers 410, 420, 430 and 440. Thus, the synchronization controller 240 maintains a substantially constant ratio between the velocity of the slave photoreceptor belt 450 and the exposure velocities of the imagers 410, 420, 430 and 440 during the print run. As explained above, because changes in the ratio between the slave photoreceptor belt 450 velocity and the exposure velocities of the imagers 410, 420, 430 and 440 causes image registration errors, the systems and methods of this invention can reduce such image registration errors by maintaining a substantially constant ratio between these velocities during print runs.

In accordance with one exemplary embodiment of the systems and methods of this invention, the photoreceptor belt velocity controller 242 and the imager velocity controller 244 can also adjust the respective velocity of the slave photoreceptor belt 450 and the exposure velocities of the imagers 410, 420, 430 and 440 at the same, or at least at about the same, quantization level. Thus, the adjustments to both velocities can be made at a level that is achievable by both subsystems. Consequently, the systems and methods of this invention can significantly reduce demands on the adjustment resolution capabilities of the controller having the coarsest level of resolution, which is typically the imager velocity controller 244.

In accordance with one exemplary embodiment of the systems and methods of this invention, the photoreceptor belt velocity controller 242 and the imager velocity controller 244 have substantially matched dynamic responses. That is, in this exemplary embodiment, the photoreceptor belt velocity controller 242 and the imager velocity controller 244 have substantially the same damping characteristics. The damping characteristics can be within the range of underdamped, critically damped or overdamped systems. Preferably, the damping characteristics are critically damped to achieve the best latitude for matching the responses. In addition, in this exemplary embodiment the photoreceptor belt velocity controller 242 and the imager velocity controller 244 also have the same, or at least closely matched, bandwidths, such that the relative difference between the two bandwidths is small, or even zero. The matched dynamic responses can be achieved using conventional electromechanical control systems known to those skilled in the art.

As explained above, if the velocity of the slave photoreceptor belt 450 is not properly matched with the exposure velocities of the image sources of the exposure stations 414, 424, 434 and 444 of the imagers 410, 420, 430 and 440, respectively, then the image length will be adversely affected. The exposure velocity can correspond, for example, to the sweep-scan velocity of the rotating polygon raster output scanners in the imagers 410–440. For example, if the velocity of the slave photoreceptor belt 450 is too fast relative to the exposure velocities of one or more of the imagers 410–440, then the image formed by each such imager 410–440 will become longer than the specified length. Thus, it is important to properly match the ratio of the velocity of the slave photoreceptor belt 450 to the exposure velocities of the imagers 410, 420, 430 and 440 to control the image size.

Based on the measured periods of revolution of the respective master and slave photoreceptor belts 350 and 450, the synchronization controller 240 adjusts the velocity of the slave photoreceptor belt 450 and the exposure velocities of the exposure stations 414, 424, 434 and 444 of the imagers 410, 420, 430 and 440, respectively, of the slave print engine 400 to maintain the first and second photoconductive belts 350 and 450 in a synchronized state, i.e., at the same periods of revolution. This velocity adjustment also maintains a desired ratio between the velocity of the slave photoreceptor belt 450 and the exposure velocities of the imagers 410, 420, 430 and 440. This substantially prevents forming an image on the seam 455 and reduces image registration errors between the color images formed on the slave photoreceptor belt 450. Accordingly, when the electrostatic latent images developed at each of the developing stations 416, 426, 436 and 446 are developed, the resulting color separation images formed by each of the imagers 410, 420, 430 and 440 will be substantially aligned with each other, thus minimizing image registration errors between the various color separation images.

The resulting color separation images formed by each of the imagers 410, 420, 430 and 440 will be substantially aligned with a desired position on the image receiving substrate. Accordingly, when the resulting color separations are transferred onto the image receiving substrate at the transfer station 460, the resulting color separation images formed by each of the imagers 410, 420, 430 and 440 will be substantially aligned with the desired position on the image receiving substrate. This minimizes, for example, any misregistration between the various color separation images formed by the imagers 410, 420, 430 and 440 and any other images on the image receiving substrate.

Figure 5:
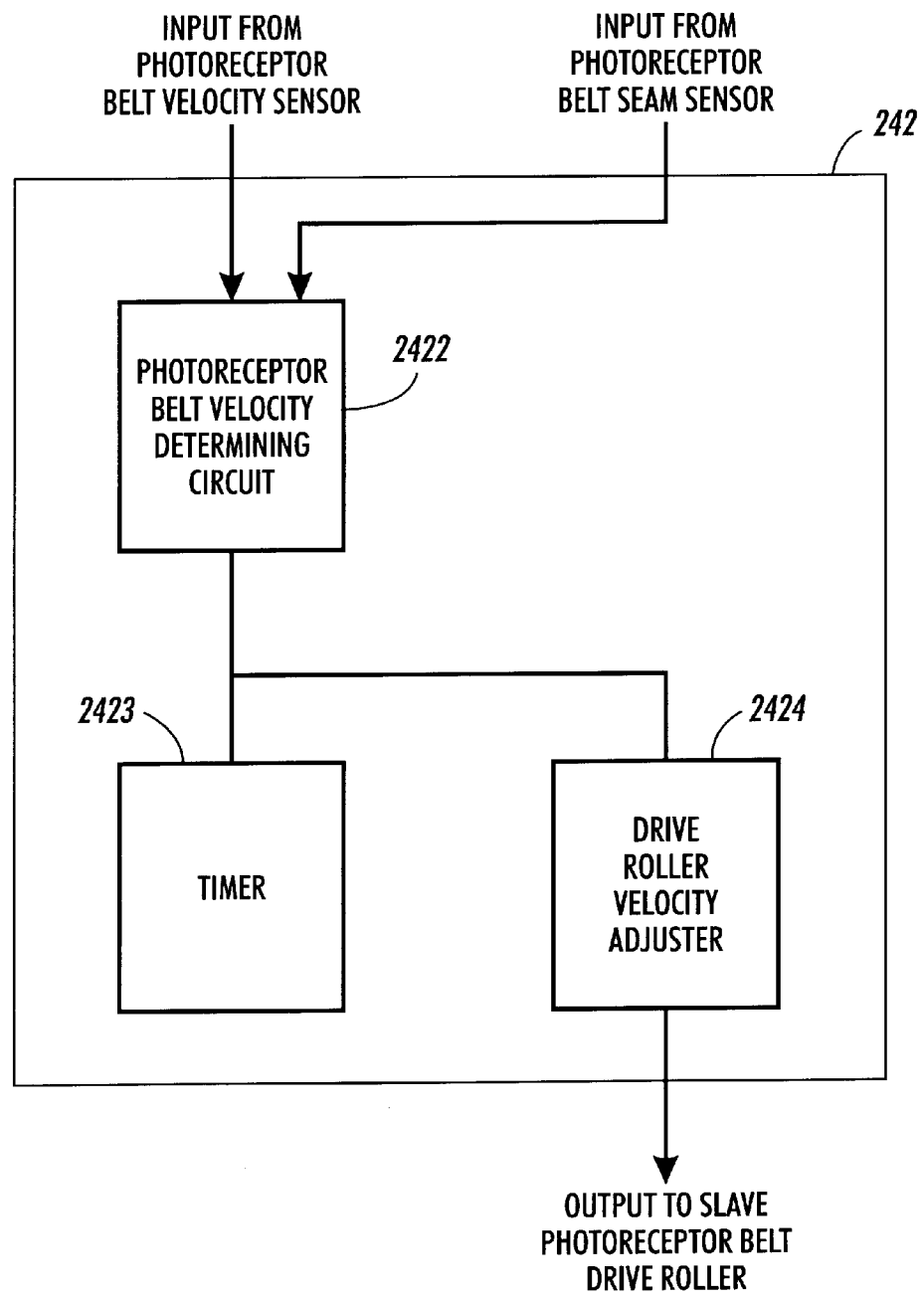
FIG. 5 illustrates one exemplary embodiment of the slave photoreceptor velocity controller of this invention.

FIG. 5 illustrates one exemplary embodiment of the photoreceptor belt velocity controller 242 of FIG. 4. This controller includes a photoreceptor belt velocity determining circuit 2422, a timer 2424 and a drive roller velocity adjuster 2426. The photoreceptor belt velocity sensor determining circuit 2422 receives an input from the photoreceptor belt velocity sensor 490 relating to the velocity of the slave photoreceptor belt 450 and an input from the photoreceptor belt seam sensor 480 relating to a time stamp of the slave photoreceptor belt 450.

During operation of the photoreceptor belt velocity controller 242, the timer 2424 is reset by the photoreceptor belt velocity determining circuit 2422 in response to the photoreceptor belt seam sensor 480 detecting the slave photoreceptor belt seam 455, which provides a time stamp. The period of revolution of the slave photoreceptor belt 450 is determined by the amount of time that elapses between the setting of the counter and the time at which the photoreceptor belt seam sensor 480 next detects the slave photoreceptor belt seam 455. If the determined period of revolution of the slave photoreceptor belt 450 determined by the photoreceptor belt velocity determining circuit 2422 differs from the period of revolution of the master photoreceptor belt 350, then the drive roller velocity adjuster 2426 adjusts the drive velocity of the photoreceptor belt drive roller 452 by a sufficient amount to bring the period of revolution of the slave photoreceptor belt 450 into coincidence with the period of revolution of the master photoreceptor belt 350. The velocity of the photoreceptor belt drive roller 452 can be increased or decreased, depending on whether the velocity of the slave photoreceptor belt 450 needs to be increased or decreased to synchronize the periods of revolution of the master photoreceptor belt 350 and the slave photoreceptor belt 450.

Figure 6:
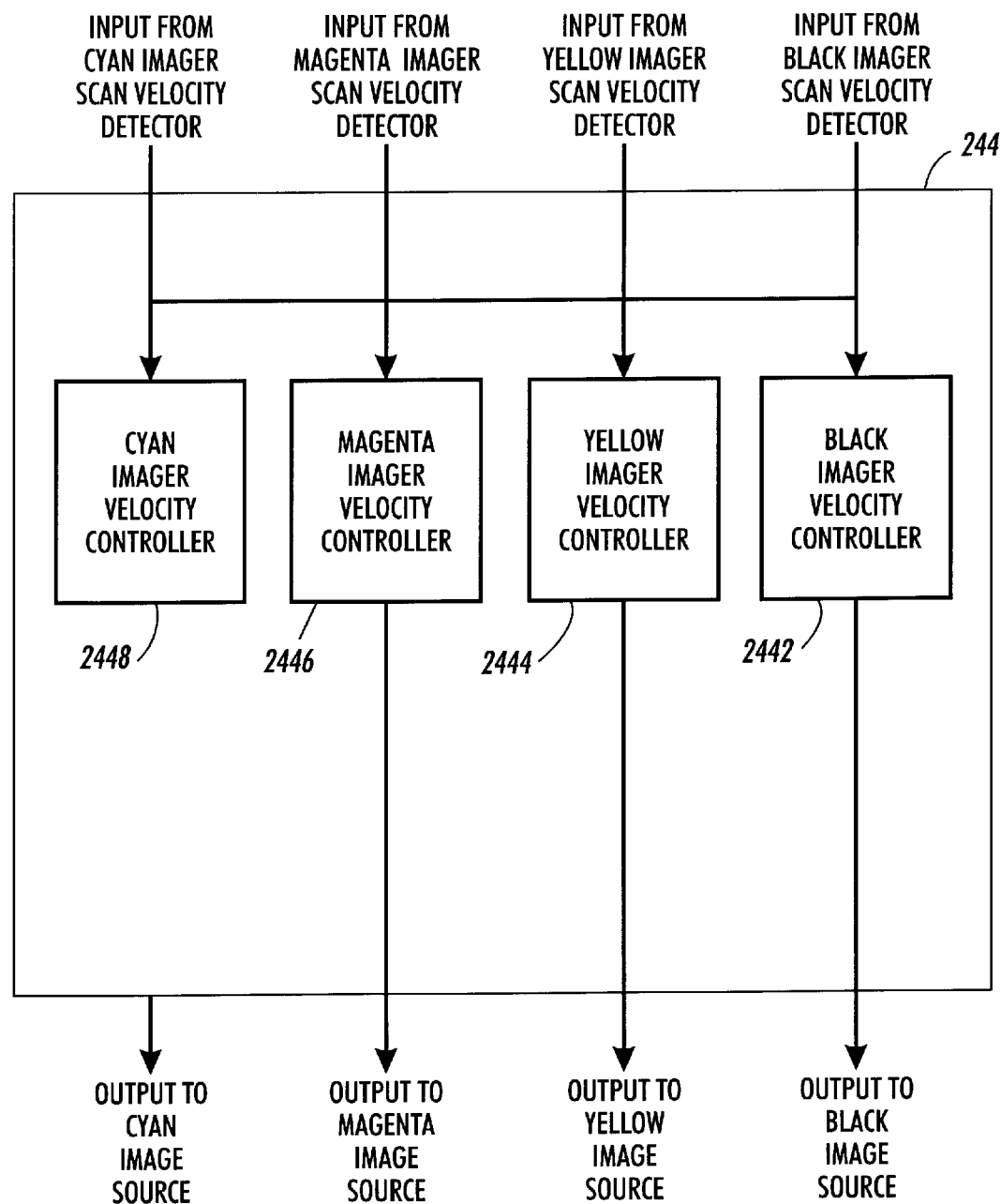
FIG. 6 illustrates one exemplary embodiment of the imager velocity controller of this invention.

FIG. 6 illustrates one exemplary embodiment of the imager velocity controller 244 of FIG. 4. This controller includes a black imager velocity controller 2442, a yellow imager velocity controller 2444, a magenta imager velocity controller 2446 and a cyan imager velocity controller 2448.

In operation, the imager velocity controllers 2442-2448 receive inputs from the scan velocity detectors associated with the corresponding one of the respective imagers 410–440. For example, the black imager velocity controller 2442 receives an input from the scan velocity detector 419 associated with the black imager 410. Based on these inputs, the imager velocity controllers 2442–2448 provide an output to the respective exposure stations 414, 424, 434 and 444 for the respective imagers 410, 420, 430 and 440. The outputs cause the exposure velocities of the respective imagers 410–440 to either be increased or decreased. This control maintains a constant velocity at a set-point for the imagers 410–440, which velocity is related to the velocity of the slave photoreceptor belt 450.

For example, with reference to FIG. 4, the output signal from the black imager velocity controller 2442 causes the image source 4142 and the rotating polygon mirror 4146 to operate to either increase or decrease the speed at which the light beam 4144 is scanned across the slave photoreceptor belt 450 to form the scanlines 418 and the black separation image 417.

For the imagers 410–440, the velocities of the respective image sources are adjusted when the velocity of the slave photoreceptor belt 450 is adjusted to synchronize the slave photoreceptor belt 450 with the master photoreceptor belt 350. If the slave photoreceptor belt 450 velocity is increased or decreased by the photoreceptor belt velocity controller 242, then the exposure velocities of image sources of the imagers 410–440 are likewise increased or decreased, so that a constant ratio between the velocity of the slave photoreceptor belt 450 and the velocities of the imagers 410–440 is maintained during the print run.

To maintain a constant ratio between the velocity of the slave photoreceptor belt 450 and the velocities of the imagers 410–440 during print runs, the velocity of the slave photoreceptor belt 450 and the velocities of the imagers 410–440 are adjusted by the same percentage. For example, if the velocity of the slave photoreceptor belt 450 is originally 2 and the velocity of each of the imagers 410–440 is 1, then if the velocity of the slave photoreceptor belt 450 is increased to 3, the velocity of the imagers 410–440 is increased to 1.5 to maintain a constant ratio of 2:1 between these velocities. This ratio defines the magnification of the image in the process direction.

The individual image sources of the imagers 410–440 are individually adjusted when the velocity of the slave photoreceptor belt 450 is adjusted. The amount of velocity adjustment of the individual image sources of the imagers 410–440 can vary to correct any errors between these velocities and to achieve the above-described constant ratio between the velocity of the slave photoreceptor belt 450 and the velocities of the imagers 410–440.

The velocity adjustments are simultaneously made such that the relative ratio between the velocity of the slave photoreceptor belt 450 and the imagers 410–440 of the slave print engine 400 is maintained substantially constant, so that this ratio does not substantially change during print runs. Thus, to maintain this substantially constant ratio in velocities, the velocity of the imagers 410–440 is adjusted whenever the velocity of the slave photoreceptor belt 450 is adjusted. In this manner, image registrations errors in the slow scan or process direction of the slave photoreceptor belt 450 can be reduced or substantially eliminated.

Figure 7:
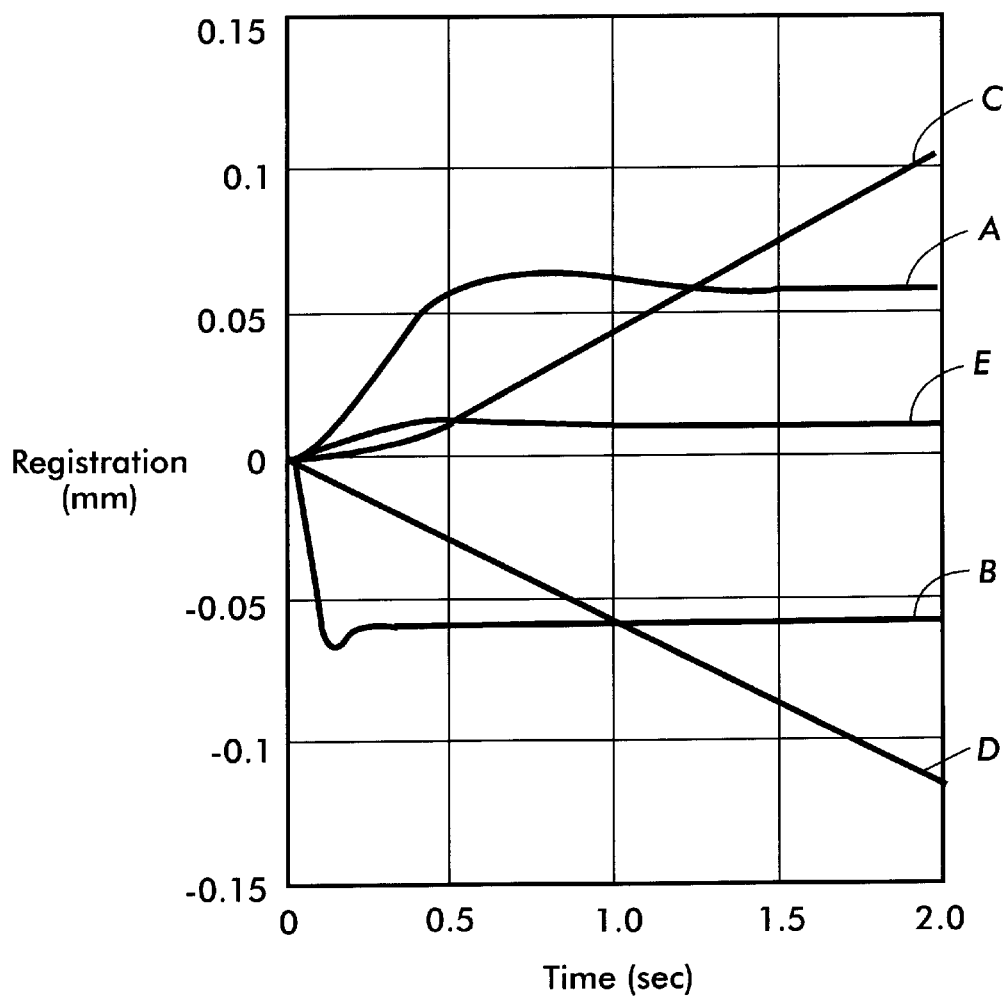
FIG. 7 shows modeled residual image registration error with a 25 Hz difference between the bandwidths of the photoreceptor belt controller and the imager controller.

FIG. 7 illustrates the modeled residual image registration error versus time following controller actuation, in an exemplary embodiment in which the photoreceptor belt velocity controller 242 and the imager velocity controller 244 have bandwidths of 5 Hz and 30 Hz, respectively. Thus, there is a bandwidth difference of 25 Hz between them. The quantization level or velocity change amplitude of the photoreceptor belt velocity controller 242 was set at the same level as that of the imager velocity controller 244. In FIG. 7, both the photoreceptor belt velocity controller 242 and the imager velocity controller were actuated at time t=0. Curve A represents the velocity response of the photoreceptor belt velocity controller 242, which has a bandwidth of 5 Hz. Curve B represents the velocity response of the image velocity controller 244, which has a bandwidth of 30 Hz. Curves C and D represent the two velocity curves A and B, respectively, integrated over time to position. Curve E represents the resulting registration error, which equals the sum of the two position curves C and D. Curve E shows that the errors caused by a velocity change in one of the photoreceptor belt 450 or the imagers 410–440 can be substantially canceled by an opposite change in the other one of the photoreceptor belt 450 or the imagers 410–440. The maximum incremental registration error due to these velocity corrections is about 0.013627 mm.

Figure 8:
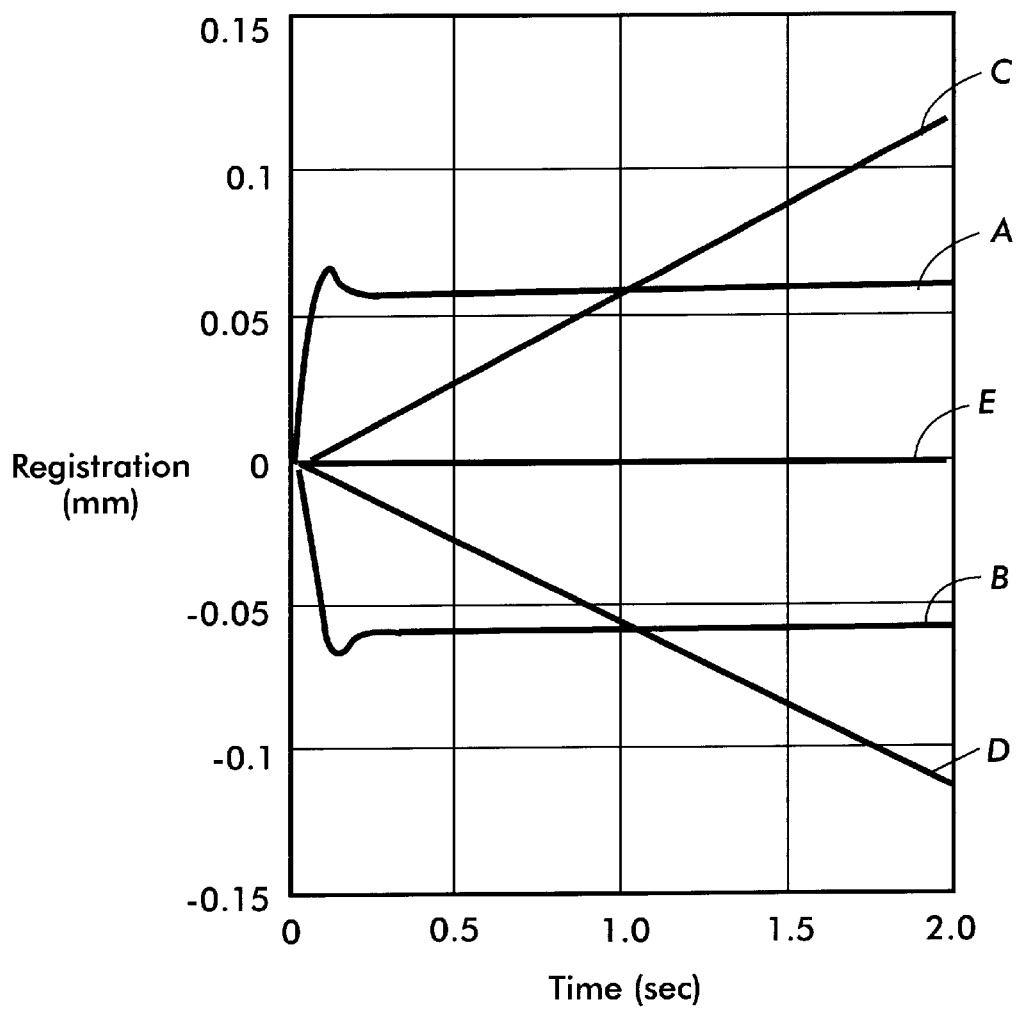
FIG. 8 illustrates the modeled residual image registration error with a 10 Hz difference between the bandwidths of the photoreceptor belt controller and the imager controller.

FIG. 8 illustrates the modeled residual image registration error versus time following controller actuation in an exemplary embodiment in which the photoreceptor belt velocity controller 242 and the imager velocity controller 244 have bandwidths of 40 Hz and 30 Hz, respectively. Thus, there is a difference in bandwidth of 10 Hz. The velocity amplitude of the photoreceptor belt velocity controller 242 equals that of the imager velocity controller 244. Curve A represents the velocity response of the photoreceptor belt velocity controller which has a bandwidth of 40 Hz. Curve B represents the velocity response of the image velocity controller 244, which has a bandwidth of 30 Hz. Curves C and D represent the two velocity curves A and B, respectively, integrated over time to position. Curve E represents the resulting registration error. Curve E shows that the errors caused by a velocity change in one of the photoreceptor belt 450 or the imagers 410–440 can be substantially canceled by an opposite change in the other one of the photoreceptor belt 450 or the imagers 410–440. The maximum incremental registration error due to these velocity corrections is about 0.000815 mm.

FIGS. 7 and 8 clearly demonstrate that the maximum registration error can be reduced by reducing the difference in bandwidths between the photoreceptor belt velocity controller 242 and the imager velocity controller 244. Thus, it is advantageous to match the bandwidths as closely as possible to most effectively reduce the image registration error.

Thus, by reducing the image registration error for the slave print engine 400 to a very small level, the incremental image registration error of the slave print engine 400, in addition to the image registration error of the master print engine 300, also becomes small. Consequently, tandem print engine configurations can be achieved with good image quality. Also, because adjustments are made to the slave print engine 400 on-line, the productivity of the tandem print engine configurations is also good.

Figure 9:
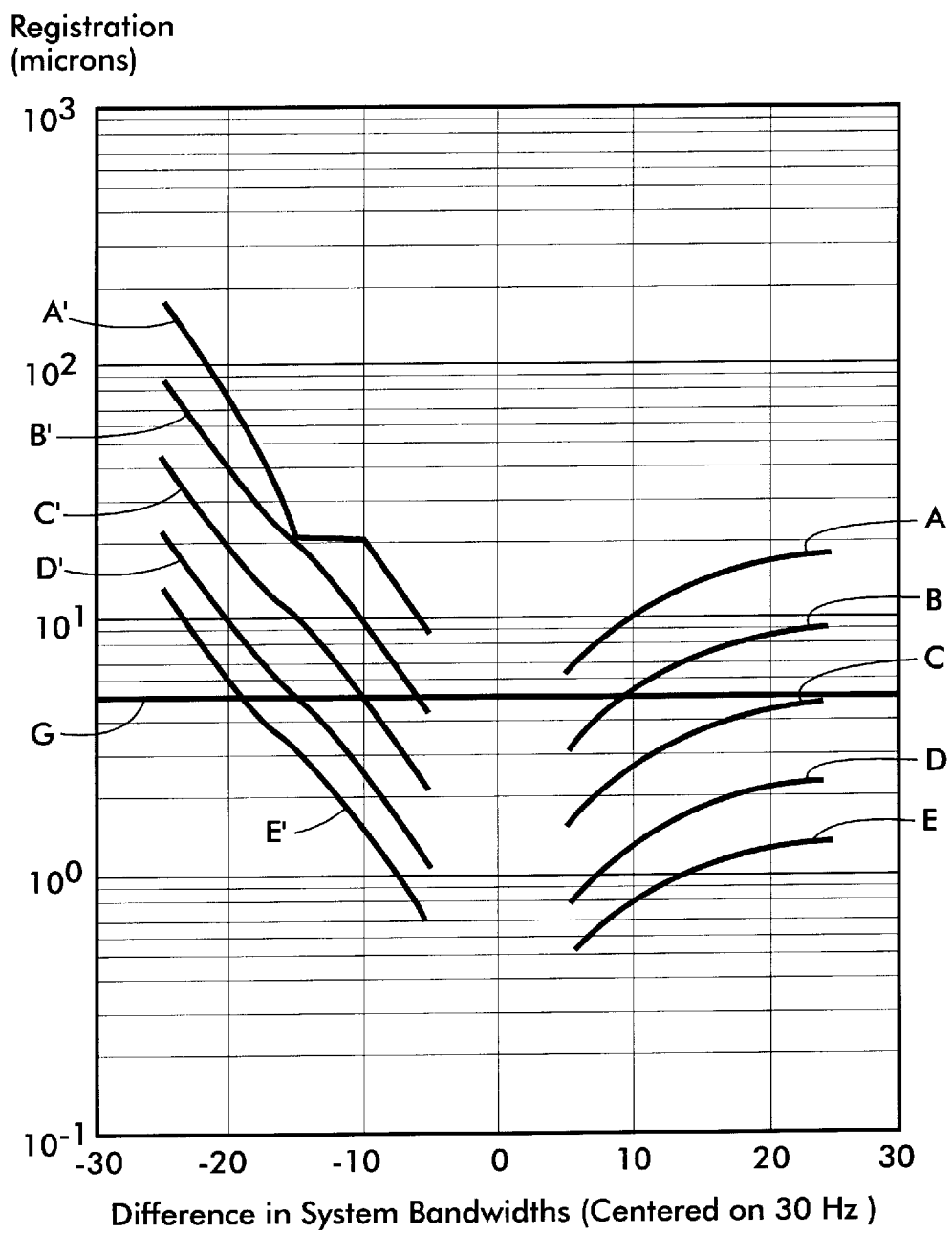
FIG. 9 shows residual incremental image registration error versus bandwidth difference after matching the photoreceptor belt velocity controller and the imager velocity controller velocity changes at various quantization levels.

FIG. 9 illustrates the modeled registration error versus difference in bandwidths for the photoreceptor belt velocity controller 242 and the imager velocity controller 244 at various quantization levels for these controllers. In FIG. 9, the two controllers both have the same selected quantization level. As shown in curves A–E, respectively, and A'–E', respectively, as the number of quantization levels increases from 16 levels to 256 levels, the registration error decreases. At all quantization levels, the error increases as the relative difference in bandwidths between the belt velocity controller 430 and the imager velocity controller 440 increases. Curve G represents the registration goal of 5 microns.

As shown, for curves C-E which represent 64, 128 and 256 adjustment levels of the controllers, respectively, the maximum registration error fell below the registration goal of 5 microns at all modeled differences in system bandwidths. Thus, it can be appreciated from curves C–E that low registration errors can be achieved at these adjustment levels at differences in system bandwidths between approximately –25 Hz to +25 Hz. For curve B, which represents 32 adjustment levels, the registration error fell below the registration goal of 5 microns for differences in system bandwidth differences approximately between –7 Hz to 10 Hz, which can be easily achieved. For curve A, which represents 16 different adjustment levels of the belt velocity controller 242 and the imager velocity controller 244, the registration error was above the registration goal of 5 microns for the entire range of modeled differences in system bandwidths. Accordingly, this level of adjustment is too coarse to achieve the goal represented by curve F.

The positive differences in system bandwidths represented by the curves A–E correspond to systems in which, the photoreceptor belt velocity controller 242 has a bandwidth that is greater than the bandwidth of the imager velocity controller 244. In contrast, the negative differences in system bandwidths represented by the curves A'–E' correspond to systems in which, the photoreceptor belt velocity controller 242 has a bandwidth that is less than the bandwidth of the imager velocity controller 244.

Figure 10:
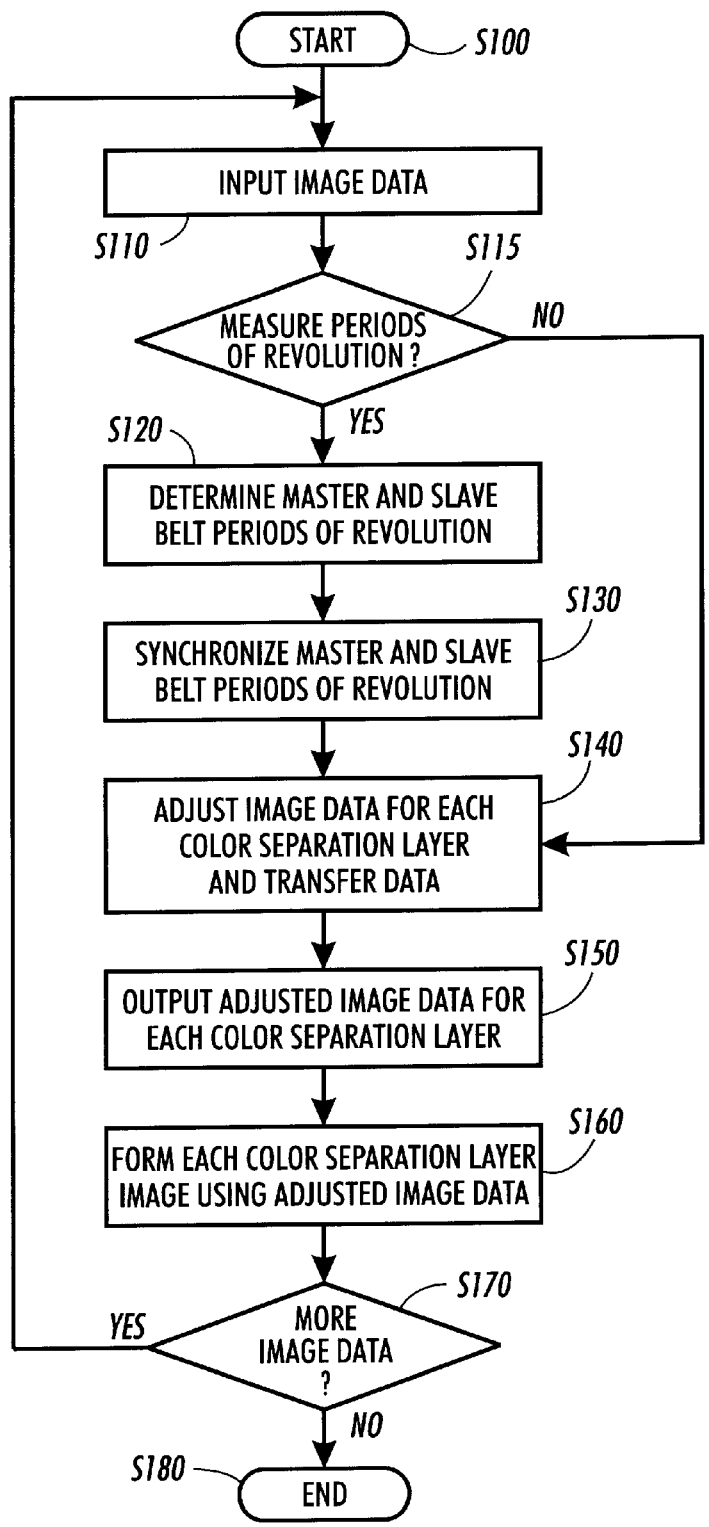
FIG. 10 is a flowchart outlining one exemplary embodiment of a control method according to this invention.

FIG. 10 is a flowchart outlining one exemplary embodiment of a control method according to this invention. Beginning at step S100, control continues to step S110, where the electronic image data is input. Then, in step S115, a determination is made whether the periods of revolution of the slave and master photoreceptor belts need to be measured. If so, control continues to step 120. Otherwise, control goes directly to step 140. In step S120, the periods of revolution of the master photoreceptor belt and the slave photoreceptor belt are both determined. Additional processing and filtering can be applied to reduce sampling noise and improve control quality. Then, in step S130, the periods of revolution of the master photoreceptor belt and the slave photoreceptor belt are synchronized so as to substantially equal to each other. Control then continues to step S140.

In step S140, the image data for each color separation layer to be formed on the master photoreceptor belt and the slave photoreceptor belt is adjusted and the image data is transferred. Then, in step S150, the adjusted image data is outputted for each color separation layer. Next, in step S160, the different color separation layers are formed by the appropriate imagers of the slave print engine using the adjusted image data. Control then continues to step S170.

In step S170, the image data is checked to determine if more image data needs to be written using either the slave or master print engines. If so, control goes back to step 110 Otherwise, control continues to step S180. In step S180, the control routine ends.

Figure 11:
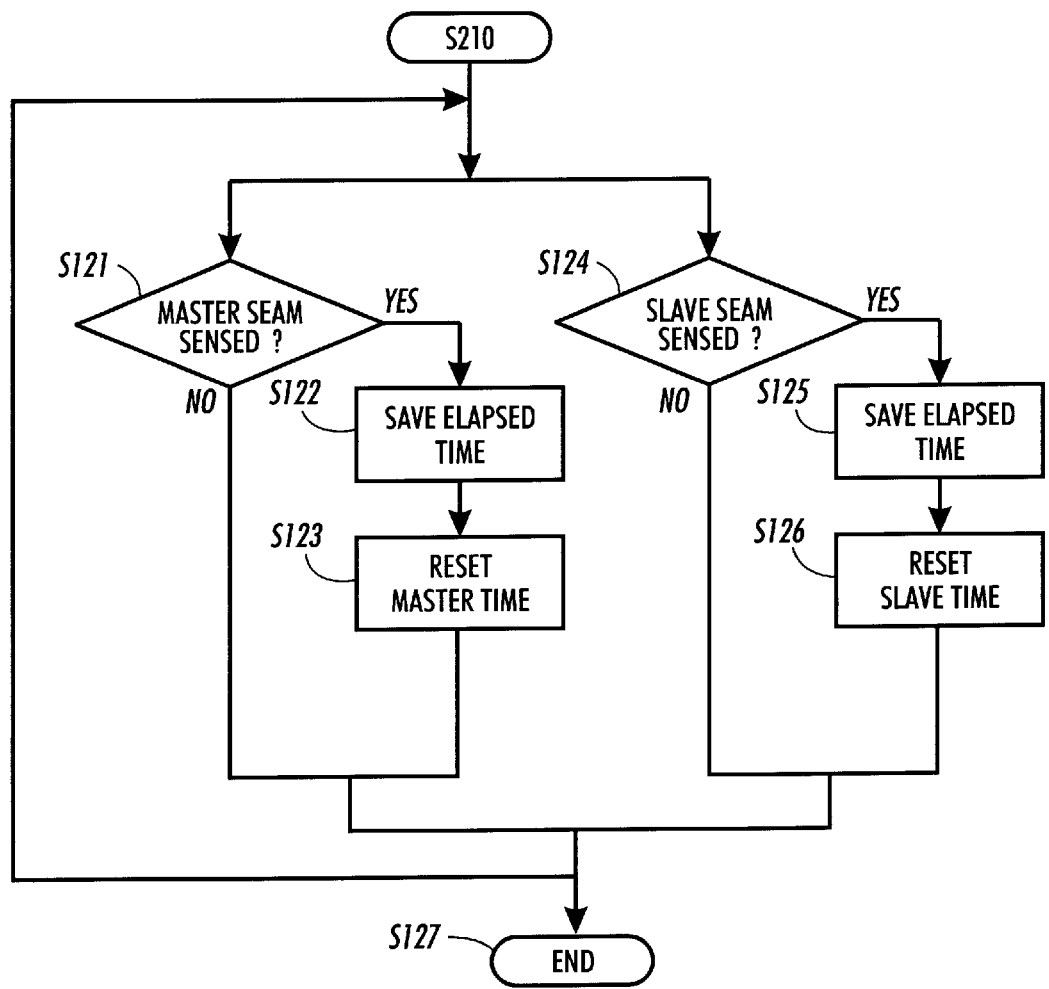
FIG. 11 is a flowchart outlining in greater detail one exemplary embodiment of a method of measuring the periods of revolution of the master and slave photoreceptor belts of FIG. 10.

FIG. 11 is a flowchart outlining in greater detail one exemplary embodiment of a method of measuring the periods of revolution of the master and slave photoreceptor belts of step FIG. 10. Starting in step S120, control continues to step S127 if the master and slave photoreceptor belt seams are not sensed. Otherwise, control continues to step S121 and step 124, where the master photoreceptor belt seam and the slave photoreceptor belt seam are sensed, respectively. For the master print engine, control continues to step S122 where the elapsed time is saved, and then to step S123, where the timer for the master photoreceptor belt is reset. For the slave print engine, control then continues to step S125 where the elapsed time is saved, and then to step S126, where the timer for the master photoreceptor belt is reset. Control continues to steps S127, where control returns to step S120.

Figure 12:
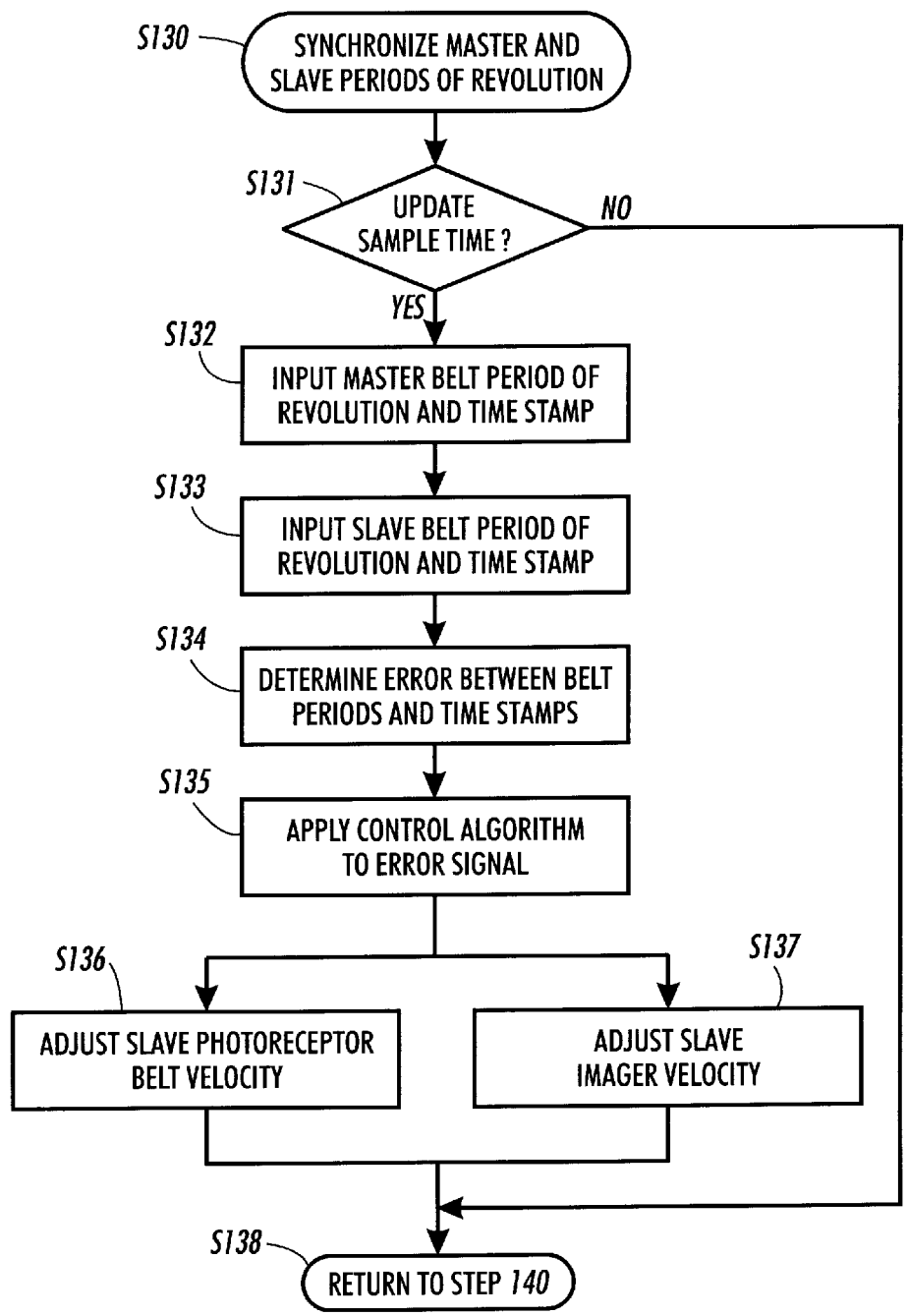
FIG. 12 is a flowchart outlining in greater detail one exemplary embodiment of a method of synchronizing the periods of revolution of the photoreceptor belts of the master and slave print engines of FIG. 10.

FIG. 12 is a flowchart outlining in greater detail one exemplary embodiment of a method of synchronizing the periods of revolution of the master photoreceptor belt and the slave print engine of step S130 shown in FIG. 10. Starting in step S130, control continues to step S131, where it is determined whether the sample time should be updated. If no, control continues to step 138 which returns the control to step 140.

If yes, control continues to step S132, where the measured period of revolution of the master photoreceptor belt and time stamp of this belt are input. Then, in step S133, the measured period of revolution of the slave photoreceptor belt are time stamp of this belt are input. In step S134, the error between the periods of revolution of the master photoreceptor belt and the slave photoreceptor belt, and the error between the time stamps of the master photoreceptor belt and the slave photoreceptor belt are determined.

In step S135, a control algorithm is applied to the error signals for the periods of revolution and the time stamps of the master and slave photoreceptor belts. In step S136, the velocity of the slave photoreceptor belt is adjusted based on the error determined in S134. If the period of revolution of the slave photoreceptor belt is less than the period of revolution of the master photoreceptor belt, then the period of revolution of the slave photoreceptor belt is increased to match that of the slave photoreceptor belt. To increase the period of revolution of the slave photoreceptor belt, the velocity of the slave photoreceptor belt is decreased from its current value. Similarly, if the period of revolution of the slave photoreceptor belt is greater than the period of revolution of the master photoreceptor belt, then the slave photoreceptor belt is moving too slowly and its velocity is increased such that the periods of revolution of master photoreceptor belt and the slave photoreceptor belt match each other.

Additionally, whenever the velocity of the slave photoreceptor belt is adjusted by the photoreceptor belt velocity controller as described above, to synchronize the periods of revolution of the master photoreceptor belt and the slave photoreceptor belt, the imagers of the slave print engine are also adjusted at the same time.

Accordingly, in step S137, the velocity of the imagers of the slave print engine are adjusted when the slave photoreceptor belt velocity is adjusted. For example, if the velocity of the slave photoreceptor belt is increased to decrease the period of revolution, then the imager velocities are increased by an appropriate amount to counter the effect of the velocity increase of the slave photoreceptor belt, so as to prevent growth of the image in the process direction of the slave print engine. Similarly, if the velocity of the slave photoreceptor belt is decreased to increase the period of revolution, then the imager velocities are reduced by an appropriate amount to counter the effect of the velocity decrease of the slave photoreceptor belt, to prevent shrinking of the image in the process direction.

Control continues to step S138, where control returns to step S140.

As shown in FIG. 2, the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing the finite state machine that is in turn capable of implementing the flowcharts shown in FIGS. 10–12, can be used to implement the image processing apparatus.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention. Thus, it should be appreciated that various other modifications and changes may occur to those skilled in the art without departing from the spirit and scope of this invention.

What is claimed is:

1. A image processing apparatus that includes tandem print engines for forming an image on an image receiving substrate, comprising:

a first print engine comprising a first photoreceptor including a first photoreceptor belt having a first period of revolution;

a second print engine comprising a second photoreceptor including a second photoreceptor belt having a second period of revolution; and a synchronization controller that substantially matches the first period of revolution of the first photoreceptor belt and the second period of revolution of the second photoreceptor belt during a print run of the image processing apparatus, such that a first image registration error of a first image formed on the image receiving substrate by the first print engine substantially equals a second image registration error of a second image formed on the image receiving substrate by the second print engine.

2. The image processing apparatus of claim 1, wherein the second print engine is positioned downstream from the first print engine.

3. The image processing apparatus of claim 2, wherein:
the second print engine further comprises a plurality of imagers positioned along a process direction of the second photoreceptor belt, each of the imagers including an image source for exposing the second photoreceptor belt; and
the synchronization controller further comprises:
a first controller for controlling the belt velocity of the second photoreceptor belt such that the second period of revolution of the second photoreceptor belt substantially matches the first period of revolution of the first photoreceptor belt during the print run, and
a second controller for controlling the exposure velocities of the respective image sources on the second photoreceptor belt.

4. The image processing apparatus of claim 3, wherein the first and second controllers are simultaneously actuated during the print run of the image processing apparatus to adjust the respective belt velocity of the second photoreceptor belt and the exposure velocities of the image sources on the second photoreceptor belt.

5. The image processing apparatus of claim 4, wherein a ratio between the belt velocity and the exposure velocities is maintained at a substantially constant value during the print run.

6. The image processing apparatus of claim 4, wherein the imagers each comprise a raster output scanner that scans laterally across the second photoreceptor belt at the exposure velocity.

7. The image processing apparatus of claim 4, the first controller has a first dynamic response and the second controller has a second dynamic response that substantially matches the first dynamic response.

8. The image processing apparatus of claim 7, wherein the first controller has a first bandwidth and the second controller has a second bandwidth that substantially equals the first bandwidth.

9. The image processing apparatus of claim 8, wherein the first and the second controller have substantially the same damping characteristics.

10. The image processing apparatus of claim 3, wherein the first controller and the second controller adjust the belt velocity of the second photoreceptor belt and the exposure velocities of the image sources, respectively, at substantially the same quantization level.

11. The image processing apparatus of claim 1, further comprising an inverter that inverts the image receiving substrate during movement of the image receiving substrate between the first print engine and the second print engine, wherein the first print engine prints on a simplex side of the image receiving substrate and the second print engine prints on a duplex side of the image receiving substrate.

12. The image processing apparatus of claim 1, wherein the first print engine and the second print engine are each a multi-color print engine, and the first image and the second image are each a multi-color image.

13. A image processing apparatus that includes tandem print engines for forming an image on an image receiving substrate, comprising:
a first print engine comprising a first photoreceptor including a first photoreceptor belt having a first period of revolution;
a second print engine downstream from the first print engine, the second print engine comprising a second photoreceptor including a second photoreceptor belt having a second period of revolution and a plurality of imagers positioned along a process direction of the second photoreceptor, each of the imagers including an image source for exposing the second photoreceptor belt; and
a synchronization controller for (i) controlling the belt velocity of the second photoreceptor belt such that the second period of revolution of the second photoreceptor belt substantially matches the first period of revolution of the first photoreceptor belt during the print run, and (ii) controlling the exposure velocities of the image sources on the second photoreceptor belt so as to maintain a substantially constant ratio between the velocity of the second photoreceptor belt and the exposure velocities during the print run.

14. The image processing apparatus of claim 13, wherein the synchronization controller substantially matches the first period of revolution and the second period of revolution during a print run of the image processing apparatus, such that a difference between a first image registration error of a first image formed on the image receiving substrate by the first print engine differs from a second image registration error of a second image formed on the image receiving substrate by the second print engine is less than about a desired value.

15. The image processing apparatus of claim 13, wherein the synchronization controller comprises a first controller that controls the belt velocity of the second photoreceptor belt and a second controller that controls the exposure velocities of the imagers.

16. The image processing apparatus of claim 15, wherein the first and second controllers are simultaneously actuated during the print run of the image processing apparatus to adjust the respective belt velocity of the second photoreceptor belt and the exposure velocities of the image sources on the second photoreceptor belt.

17. The image processing apparatus of claim 15, wherein the first controller and the second controller are simultaneously actuated, and the first controller has a first dynamic response and the second controller has a second dynamic response that substantially matches the first dynamic response.

18. The image processing apparatus of claim 15, wherein the first controller and the second controller adjust the belt velocity of the second photoreceptor belt and the exposure velocities of the image sources, respectively, at substantially the same quantization level.

19. The image processing apparatus of claim 13, wherein the first print engine and the second print engine are each a multi-color print engine, and the first print engine and the second print engine each form a multi-color image on a respective side of the image receiving substrate.

20. An image processing method for forming an image on an image receiving substrate using an image processing apparatus comprising a first print engine including a first photoreceptor belt having a first period of revolution, and a second print engine arranged in tandem with the first print engine, the second print engine including a second photoreceptor belt having a second period of revolution, the method comprising:
measuring the first period of revolution of the first photoreceptor belt;
measuring the second period of revolution of the second photoreceptor belt;
matching the first period of revolution and the second period of revolution during a print run;
forming a first image on the image receiving substrate at the first print engine, the first image having a first image registration error; and forming a second image on the image receiving substrate at the second print engine, the second image having a second image registration error;

wherein the first image registration error substantially equals the second image registration error.

21. The method of claim 20, wherein the first photoreceptor comprises a first photoreceptor belt and the second photoreceptor comprises a second photoreceptor belt.

22. The method of claim 21, wherein:

the second print engine further comprises a plurality of imagers positioned along a process direction of the second photoreceptor belt, each of the imagers including an image source for exposing the second photoreceptor belt; and matching the first and second periods of revolution comprises:
 determining a difference between the measured first period of revolution and the measured second period of revolution;
 adjusting the belt velocity of the second photoreceptor belt such that the second period of revolution substantially equals the first period of revolution; and
 simultaneously with adjusting the velocity of the second photoreceptor belt, adjusting an exposure velocity of each of the image sources to maintain a substantially constant ratio between the belt velocity and the exposure velocities during the print run.

23. The method of claim 22, further comprising:

adjusting the belt velocity of the second photoreceptor belt such that the second period of revolution of the second photoreceptor belt substantially matches the first period of revolution of the first photoreceptor belt during the print run; and adjusting the exposure velocity of the image sources on the second photoreceptor belt.

24. The method of claim 23, wherein the respective belt velocity of the second photoreceptor belt and the exposure velocities of the image sources on the second photoreceptor belt are simultaneously adjusted, such that the substantially constant difference between the belt velocity and the exposure velocities is maintained during the print run.

25. The method of claim 20, wherein the first print engine and the second print engine are each a multi-color print engine, and the first image and the second image are each a multi-color image.

26. An image processing method for forming an image on an image receiving substrate using an image processing apparatus comprising a first print engine including a first photoreceptor belt having a first period of revolution, and a second print engine arranged in tandem with the first print engine and including a second photoreceptor belt having a second period of revolution and a plurality of imagers that form a color image on the second photoreceptor belt, the method comprising:

maintaining the first period of revolution of the first photoreceptor belt substantially equal to the second period of revolution of the second photoreceptor belt during a print run;

maintaining a substantially constant ratio between the velocity of the second photoreceptor belt and an exposure velocity of the plurality of imagers during the print run;

printing a first color image on the image receiving substrate at the first print engine; and printing a second color image on the image receiving substrate at the second print engine.

27. The method of claim 26, wherein the first color image has a first image registration error and the second color image has a second color image registration error that substantially equals the first color image registration error.

28. The method of claim 27, wherein the first and second image registration errors differ by less than about 5 microns.

29. The method of claim 26, wherein the velocity of the second photoreceptor belt and the exposure velocities of the imagers are simultaneously adjusted during the print run.

30. The method of claim 26, wherein the velocity of the second photoreceptor belt and the exposure velocities of the imagers are simultaneously adjusted during the print run at substantially the same dynamic response.

31. The method of claim 26, wherein the velocity of the second photoreceptor belt and an exposure velocities of the imagers are simultaneously adjusted during the print run at substantially the same quantization level.

32. The method of claim 26, wherein the first print engine and the second print engine are each a multi-color print engine, and the first color image and the second color image are each a multi-color image.

* * * * *